US012763236B2

(12) United States Patent
Min et al.

(10) Patent No.: US 12,763,236 B2
(45) Date of Patent: Oct. 13, 2026

(54) REMOTE MONITORING AND INDICATING DEVICE FOR THERMALLY PROTECTED METAL OXIDE VARISTOR

(71) Applicant: Dongguan Littelfuse Electronics Company Limited, Dongguan City (CN)

(72) Inventors: Long Min, Dongguan City (CN); Dongjian Song, Dongguan City (CN); Libing Lu, Dongguan City (CN)

(73) Assignee: Dongguan Littelfuse Electronics, Co., Ltd., Dongguan (CN)

( * ) Notice: Subject to any disclaimer, the term of this patent is extended or adjusted under 35 U.S.C. 154(b) by 414 days.

(21) Appl. No.: 18/562,591

(22) PCT Filed: Jun. 7, 2022

(86) PCT No.: PCT/IB2022/055304
§ 371 (c)(1),
(2) Date: Nov. 20, 2023

(87) PCT Pub. No.: WO2022/259153
PCT Pub. Date: Dec. 15, 2022

(65) Prior Publication Data

US 2024/0249862 A1 Jul. 25, 2024

(30) Foreign Application Priority Data

Jun. 11, 2021 (CN) ........................ 202110655770.X

(51) Int. Cl.
*H01C 7/12* (2006.01)
*H01C 1/14* (2006.01)

(52) U.S. Cl.
CPC ................. *H01C 7/12* (2013.01); *H01C 1/14* (2013.01)

(58) Field of Classification Search
CPC . H01C 7/12; H01C 1/14; H01C 7/108; H01C 1/144; H01C 7/126; H01C 1/04;
(Continued)

(56) References Cited

U.S. PATENT DOCUMENTS 3,713,069 A 1/1973 Hini
6,430,019 B1 * 8/2002 Martenson ............. H01C 7/126 361/103

(Continued)

FOREIGN PATENT DOCUMENTS

CA 2586812 A1 11/2007
CN 2845122 12/2006

(Continued)

OTHER PUBLICATIONS

International Search Report and Written Opinion for International Application No. PCT/IB2022/055304, filed Jun. 7, 2022, 11 pages.

*Primary Examiner* — Kyung S Lee
(74) *Attorney, Agent, or Firm* — KDW Firm, PLLC

(57) ABSTRACT

A thermally protected metal oxide varistor (TMOV) is disclosed. The TMOV features one or more magnets connected to the arc shield of the TMOV and a sensor. Once a fault condition occurs, the arc shield movement places the magnets near the sensor, causing the sensor to indicate the fault condition, enabling a technician to repair or replace the TMOV.

20 Claims, 6 Drawing Sheets

(58) Field of Classification Search
CPC ...... H01C 1/16; H01H 36/0013; H01H 36/00; H01H 37/08; H01H 2037/763; H01H 37/76; H02H 9/042; H02H 9/04
See application file for complete search history.

(56) References Cited

U.S. PATENT DOCUMENTS

| | | | | |
|---|---|---|---|---|
| 9,093,203 | B2 * | 7/2015 | Depping ................ | H01H 37/36 |
| 9,537,304 | B2 * | 1/2017 | Mao ....................... | H02H 9/044 |
| 9,570,260 | B2 * | 2/2017 | Yang ...................... | H01H 61/02 |
| 10,892,129 | B2 * | 1/2021 | Wang ....................... | H01C 7/10 |
| 11,410,801 | B2 * | 8/2022 | Song ...................... | H01C 17/00 |
| 2014/0232412 | A1 | 8/2014 | Sano | |
| 2016/0072271 | A1 | 3/2016 | Packard | |
| 2019/0080826 | A1 | 3/2019 | Kamensek | |
| 2020/0279701 | A1 | 9/2020 | Yang | |
| 2020/0365346 | A1 | 11/2020 | Telefus | |

FOREIGN PATENT DOCUMENTS

| | | | |
|---|---|---|---|
| CN | 101588085 | A | 11/2009 |
| CN | 101789590 | A | 7/2010 |
| CN | 109510181 | A | 3/2019 |
| CN | 216133719 | U | 3/2022 |
| DE | 202019102722 | U1 | 8/2019 |

* cited by examiner

REMOTE MONITORING AND INDICATING DEVICE FOR THERMALLY PROTECTED METAL OXIDE VARISTOR

CROSS-REFERENCE TO CORRESPONDING APPLICATIONS

This application is a national phase application claiming the benefit of and priority to International Patent Application No. PCT/IB2022/055304, filed Jun. 7, 2022, which claims the benefit of priority to Chinese Patent Application No. 202110655770.X, filed Jun. 11, 2021, entitled "MONOLITHIC MULTIPLE-CHANNEL PROTECTION DEVICE," which application is incorporated herein by reference in its entirety.

FIELD OF THE DISCLOSURE

Embodiments of the present disclosure relate to metal oxide varistors (MOVs) and, more particularly, to surge protection devices including MOVs.

BACKGROUND

Surge protection devices (SPDs) are used to protect electronic circuits and components from damage due to over-voltage fault conditions. Some SPDs may include metal oxide varistors (MOVs) that are connected between the circuits to be protected and a ground line. MOVs have a specific current-voltage characteristic that allows them to be used to protect such circuits against catastrophic voltage surges. Some SPDs utilize spring elements soldered to the electrode of the MOV. When an abnormal condition occurs, the solder melts and the spring moves, resulting in an open circuit. In particular, when a voltage that is larger than the nominal or threshold voltage is applied to the device, current flows through the MOV, which generates heat. This causes the linking element to melt. Once the link melts, an open circuit is created, which prevents the MOV from catching fire.

One type of SPD, a thermally protected Metal Oxide Varistor (TMOV), has no remote monitoring status indicator to show whether its thermal cut-off is open or not during normal operation. This lack of status indication makes it unclear whether the TMOV is functional. Thus, the replacement of a non-operational TMOV may be delayed, putting the equipment being surge protected by the TMOV at risk.

It is with respect to these and other considerations that the present improvements may be useful.

SUMMARY

This Summary is provided to introduce a selection of concepts in a simplified form that are further described below in the Detailed Description. This Summary is not intended to identify key or essential features of the claimed subject matter, nor is it intended as an aid in determining the scope of the claimed subject matter.

An exemplary embodiment of a surge protection device in accordance with the present disclosure may include a metal oxide varistor (MOV) having an electrode, a spring adjacent the MOV and having a contact lead to be connected to the electrode by a solder paste, an arc shield adjacent the spring, the arc shield to slide over the electrode in response to the solder paste being melted, a magnet on the arc shield that moves simultaneous with movement of the arc shield, and a sensor to provide an indicator, the magnet being near the sensor once the arc shield slides over the electrode.

An exemplary embodiment of a thermally protected metal oxide varistor (TMOV) status system in accordance with the present disclosure may include a TMOV and a reporting circuit. A sensor is located inside an enclosure of the TMOV and a magnet is located on an arc shield of the TMOV. The magnet moves in concert with the arc shield. The sensor provides an indication once the magnet is near the sensor. The reporting circuit issues a signal in response to receiving the indication.

An exemplary embodiment of a thermally protected metal oxide varistor (TMOV) in accordance with the present disclosure may include a metal oxide varistor (MOV) with an electrode, a spring adjacent the MOV, an arc shield adjacent the spring, a magnet located on the arc shield, and a reed switch. The spring has a contact lead that is connected to the electrode using solder paste. The arc shield includes a tension spring which causes the arc shield to slide over the electrode once the solder paste melts. The magnet moves simultaneously with the arc shield. The reed switch has two blades and the magnet is close to the reed switch when the arc shield moves over the electrode.

DETAILED DESCRIPTION

A novel thermally protected metal oxide varistor (TMOV) and a TMOV status system are disclosed. The TMOV features a sensor and one or more magnets. The one or more magnets are connected to the arc shield. Once a fault condition occurs, the arc shield slides to protect the MOV, causing the magnet(s) to be proximate the sensor, which provides an indication. Where the sensor is a reed switch, the indication is a closing of the switch. The TMOV status system includes a reporting circuit to receive indication from the sensor and issue a signal, which may be visual or audible, enabling a technician to repair or replace the TMOV following a fault event.

Figure 1:
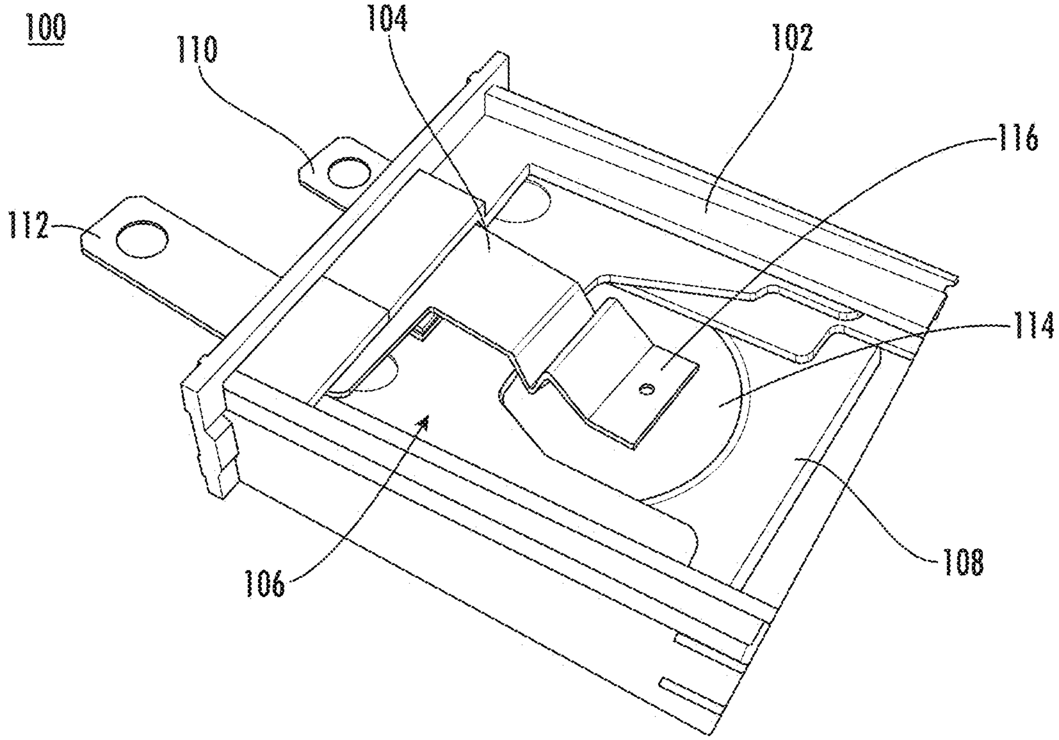
FIG. 1 (prior art)
FIG. 1 is a diagram illustrating a thermally protected metal oxide varistor, in accordance with the prior art.

FIG. 1 is a representative drawing of a surge protection device (SPD) known as a thermally protective metal oxide varistor (TMOV) 100, according to the prior art. The TMOV 100 includes a housing 102, a spring 104, an arc shield 106, an MOV 108, a first lead 110, and a second lead 112. The MOV 108, which may be epoxy coated, includes an electrode 114 which, in this example, is circular in shape. The spring 104 and the second lead 112 may optionally be formed as a single conductive piece, and includes a contact lead 116. The contact lead 116 of the spring 104 is soldered to the electrode 114 of the MOV 108.

During the assembly process, the solder paste is placed between the contact lead 116 and the electrode 114 of the MOV 108. After reflow soldering, the solder paste turns into a solid, thus forming an electrical connection between the spring 104 and the electrode 114 of the MOV 108. When a fault condition occurs, the solder melts due to overheating caused by the fault condition, thus breaking the connection between the spring 104 and the electrode 114.

In the image of FIG. 1, the TMOV 100 has not been "tripped". Thus, the arc shield 106 is not disposed directly over or above the electrode 114 of the MOV 108. Upon occurrence of a fault event, tension springs (not shown) connected to the arc shield 106 cause the arc shield to move over the electrode 114 and ensure reliable electric insulation. The arc shield 106 is thus a slider device that protects the MOV 108 from catching fire. Further, the solder paste connecting the contact lead 116 to the electrode 114 melts, causing the spring 104 to move away from the electrode, resulting in an open circuit. Once the contact lead 116 is no longer attached to the electrode 114, the springs of the arc shield 106 push the arc shield over the electrode, with the arc shield pushing the contact lead 116 even further away from the electrode. Generally, the solder paste is used to electrically connect the contact lead 116 to the electrode 114 of the MOV 108 has a low melting point, relative to the other components of the TMOV 100. Thus, the solder melts and the arc shield 106 provides cover of the electrode 114 before an electrical arc is able to catch the MOV 108 on fire.

Traditional TMOV devices lack a remote monitor to indicate whether the TMOV has been activated as described above. Once the solder is melted, an open circuit results because there is no longer a connection between the electrode 114 of the MOV 108 and the lead 112 of the spring 104. The occurrence of the fault event thus means that the TMOV should either be replaced or repaired such that the arc shield 106 is slid back to its original position and the contact lead 116 is reattached to the electrode 114. Without an indicator of some sort, the circuit being protected by the TMOV is at risk.

Figure 2A:
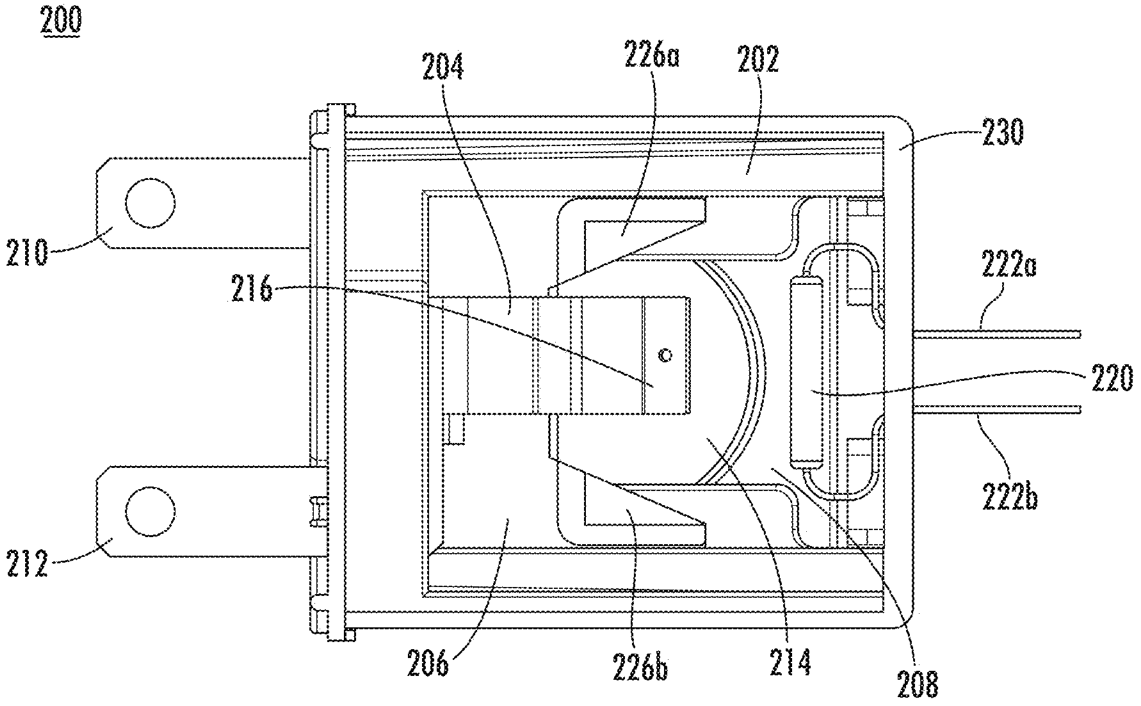
FIG. 2A is a top plan view illustrating a thermally protected metal oxide varistor, in accordance with exemplary embodiments.
Figure 2B:
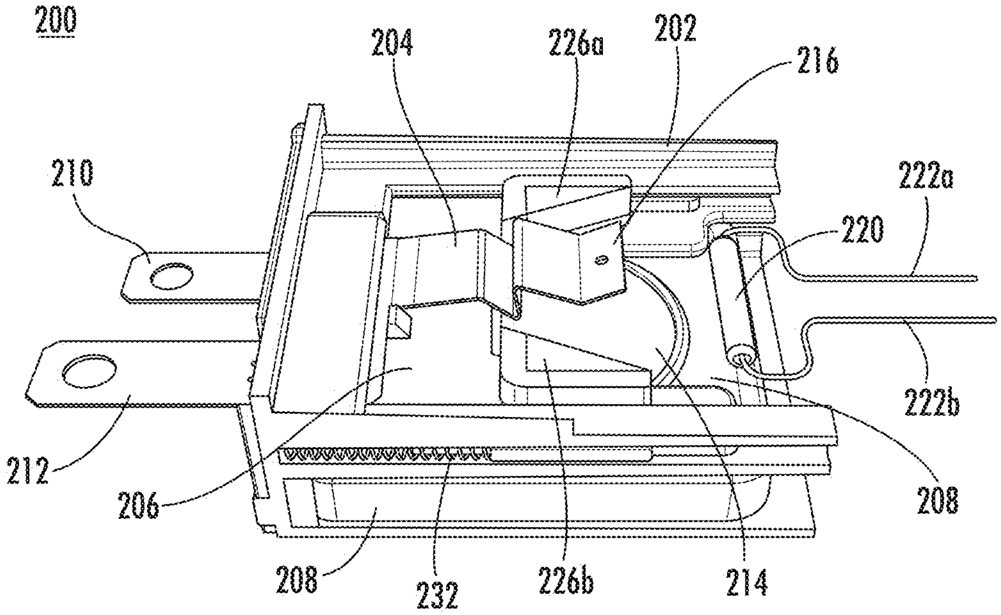
FIG. 2B is a top perspective view of the thermally protected metal oxide varistor of FIG. 2A in a post-activated (tripped) state, in accordance with exemplary embodiments.
Figure 2C:
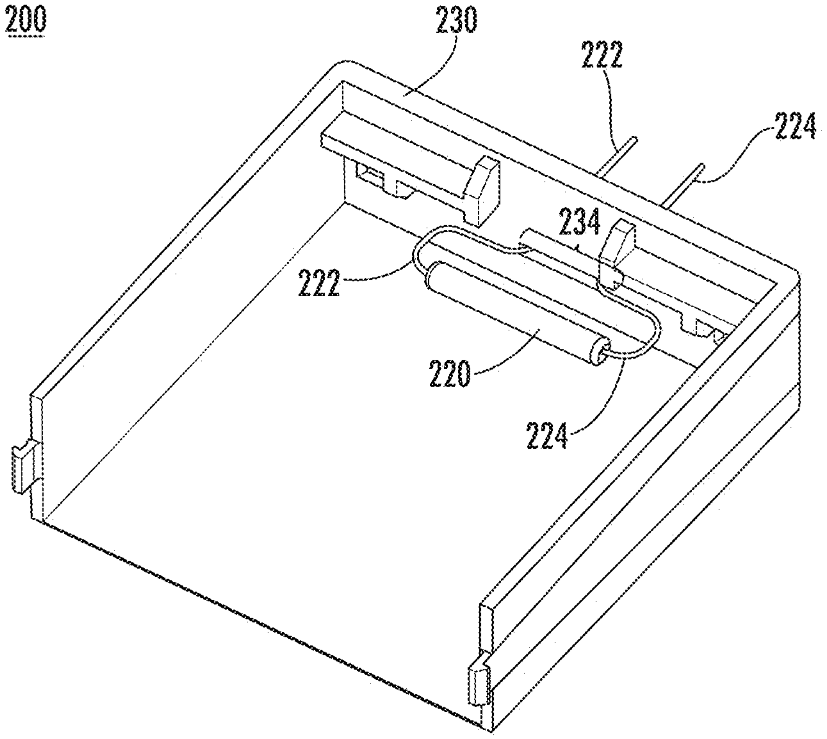
FIG. 2C is a top perspective view of an enclosure component of the thermally protected metal oxide varistor of FIG. 2A, illustrating the placement of a sensor, in accordance with exemplary embodiments.
Figure 2D:
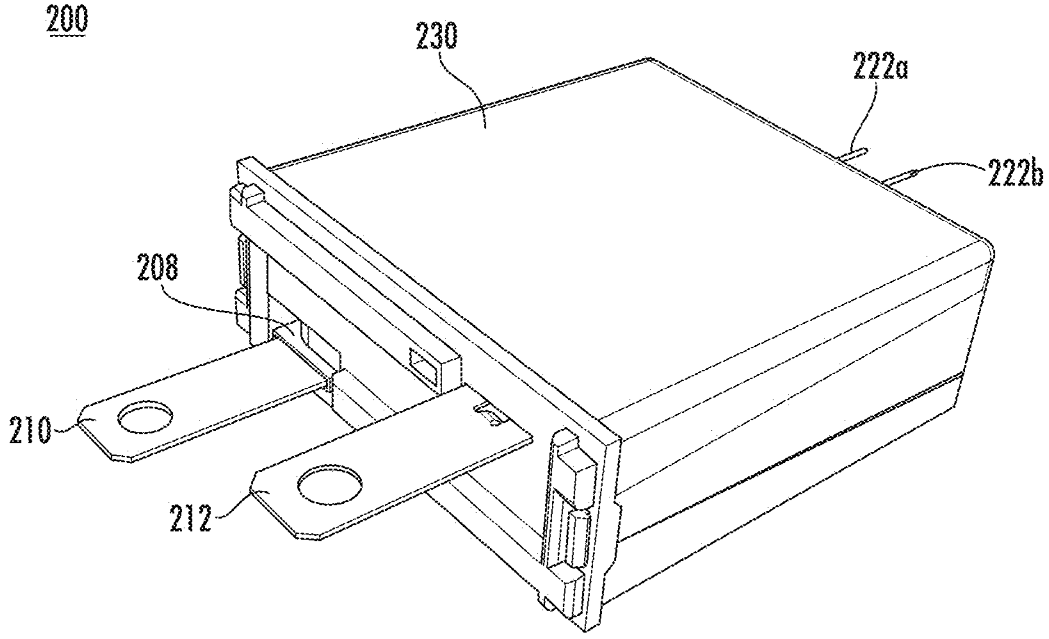
FIG. 2D is a top perspective view of the thermally protected metal oxide varistor of FIG. 2A in a fully assembled state, in accordance with exemplary embodiments.

FIGS. 2A-2D are representative drawings of a novel TMOV 200 that addresses the aforementioned drawbacks, according to exemplary embodiments. FIG. 2A is a top view of the TMOV 200, FIG. 2B is a perspective view of the TMOV, and FIGS. 2C and 2D are perspective views of the TMOV enclosure. The TMOV 200 includes a housing 202, a spring 204, an arc shield 206, an MOV 208, a first lead 210, and a second lead 212. The MOV 208, which may be epoxy coated, includes an electrode 214 which, in this example, is circular in shape. The spring 204 and the second lead 212 may optionally be formed as a single conductive piece, and includes a contact lead 216. The contact lead 216 of the spring 204 is soldered to the electrode 214 of the MOV 208.

During the assembly process, the solder paste is placed between the contact lead 216 and the electrode 214 of the MOV 208. After reflow soldering, the solder paste turns into a solid, thus forming an electrical connection between the spring 204 and the electrode 214 of the MOV 208. When a fault condition occurs, the solder melts due to overheating caused by the fault condition, thus breaking the connection between the spring 204 and the electrode 214.

The arc shield 206 is visible in both FIGS. 2A and 2B. Upon occurrence of a fault event, tension springs 232 connected to either side of the arc shield 206 (one of which is shown in FIG. 2B) cause the arc shield to slide over the electrode 214 to ensure reliable electric insulation. The arc shield 206 thus protects the MOV 208 from catching fire. Further, the solder paste connecting the contact lead 216 to the electrode 214 melts, causing the spring 204 to move away from the electrode, resulting in an open circuit. Once the contact lead 216 is no longer attached to the electrode 214, as shown in FIG. 2B, the tension springs 232 push the arc shield 206 over the electrode, with the arc shield pushing the contact lead 216 even further away (e.g., upward in FIG. 2B) from the electrode. Generally, the solder paste used to electrically connect the contact lead 216 to the electrode 214 of the MOV 208 has a low melting point, relative to the other components of the TMOV 200. Thus, the solder melts and the arc shield 206 provides cover of the electrode 214 before an electrical arc is able to catch the MOV 208 on fire.

The arc shield 206 is visible in both FIGS. 2A and 2B. In exemplary embodiments, the arc shield 206 is fitted with two magnets **226*a* and 226*b* (collectively, "magnets 226"). The magnet 226*a* is disposed on the arc shield 206 on one side of the spring 204 and the magnet 226*b* is disposed on the arc shield 206 on a second, opposing side of the spring 204. In exemplary embodiments, once the arc shield 206 slides over the electrode 214 of the MOV 208 in response to a fault event, the magnets 226 slide along with the arc shield 206. In the illustration of FIG. 2A, for example, the arc shield 206 is substantially to the left of the electrode 214 in the non-fault state of the TMOV 200, but would slide to the right, covering the electrode, in the fault state of the TMOV. Because of the disposition of the magnets 226 upon the arc shield 206, the magnets 226 would also slide to the right and therefore move closer to the sensor 220 in the fault state of the TMOV 200. In exemplary embodiments, the proximity of the magnets 226 to the sensor 220 activate the sensor 220. In exemplary embodiments, the TMOV 200 is implemented with a single magnet disposed on one side of the arc shield 206**.

In exemplary embodiments, a sensor 220 is a status indicating device integrated into the TMOV 200. In a non-limiting example, the sensor 220 is a cylindrical shape having opposing ends each connected to a conducting wire. One end of the sensor is connected to wire **222*a* and a second end of the sensor is connected to the wire 222*b* (collectively, "wires 222"), for connecting the sensor to an indicating circuit. In exemplary embodiments, the sensor 220 is seated in an enclosure 230 (FIG. 2C) of the TMOV 200, where the enclosure includes an opening 234 through which the wires 222 fit so as to be external to the TMOV and attachable to the indicating circuit. In another embodiment, the sensor 220 is affixed to the enclosure 230**.

In an exemplary embodiment, the sensor 220 is a type of magnetic sensor known as a reed switch. A reed switch is an electrical switch operated by an applied magnetic field. Flexible metal contacts at either end of the reed switch enclosure connect to a circuit. Without the presence of a magnetic field, the reed switch is in an open position. When the magnetic field is present, the metal contacts touch one another, closing the switch. In exemplary embodiments, the magnetic field which activates the sensor 220 is achieved by the magnets 228 attached to the arc shield 206. As a reed switch, the sensor 220, when activated by the magnets 228, closes a circuit to which the wires 222 are connected. The circuit is thus conducted.

In exemplary embodiments, the housing 202 and enclosure 230 are a "buckle design" where the housing slides into the disclosure as if connecting two parts of a buckle. Once the housing 202 is seated into the enclosure 230, the MOV 208 is disposed between the sensor 220 and the enclosure 230, as illustrated in FIG. 2A. Thus, the sensor 220 is disposed adjacent to and, in some embodiments, sits upon, the coating of the MOV 208. In another embodiment, the sensor 220 is fixed on the outer cover of the TMOV 200.

Although proximate the electrode 214, in exemplary embodiments, the sensor 220 is not adversely impacted by the heating of the electrode 214 during a fault event. In one embodiment, the epoxy or other coating of the MOV 208 isolates the sensor 220. In another embodiment, the sensor 220 is itself protected by a coating, such as a cylindrical glass tube, around its body. Thus, once the electrode 214 of the MOV 208 heats up in response to a fault condition, the sensor 220 continues to function.

In the non-limiting examples of FIGS. 2A and 2B, the magnets 226 are shown as triangle-shaped magnets. In some embodiments, the magnets 226 are square-shaped or rectangle-shaped. In other embodiments, the magnets are circular in shape or cylindrical. In still other embodiments, the magnets are non-conforming shapes. In exemplary embodiments, the magnets 226 supply a magnetic field that triggers the sensor 220 when proximate the sensor, closing the circuit to which the sensor is connected.

In exemplary embodiments, the sensor 220 is a status indicating device to remote monitor whether the TMOV 200 is functional. Once the TMOV 200 enters the fault state, the solder attaching the contact lead 216 of the spring 204 to the electrode 214 of the MOV 208 melts, resulting in an open circuit. The TMOV 200 in this state is thus no longer functional. Put another way, once the solder connecting the spring 204 to the MOV 208 is melted, the TMOV 200 is thermally disconnected from the circuit and no longer functional. When the TMOV 200 is thermally disconnected from the circuit, the tension springs 232 will push the arc shield 206 to move over the electrode 214 to ensure reliable electric insulation. A thermally disconnected TMOV is unable to provide fault protection to the connected circuit. The sliding operation of the arc shield 206 caused by the tension springs 232 provide electrical insulation of the MOV 208 from an arc event. In contrast to the prior art TMOV 100 (FIG. 1), the two magnets 226 mounted on the sliding arc shield 206 move closer to the sensor 220 during the sliding operation. For the reed switch implementation, when the magnetic field strength is significant enough, blades in the reed switch change from being open (not connected) to being closed (connected). In exemplary embodiments, the presence of the magnets 226 in proximity to the sensor 220 notifies a reporting circuit. Where the sensor 220 is a reed switch, the closing of the switch provides the notification that the TMOV 200 is no longer operational. In this manner, the functionality of the TMOV 200 may be remotely determined.

Figure 3:
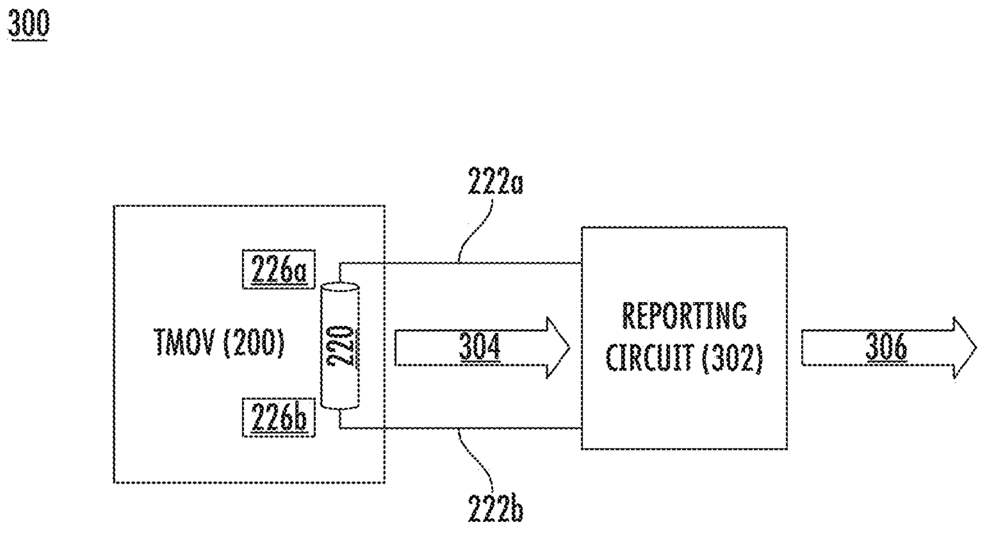
FIG. 3 is a diagram illustrating a thermally protected metal oxide varistor status system, in accordance with exemplary embodiments.

FIG. 3 is a representative drawing of a TMOV status system 300, according to exemplary embodiments. The TMOV status system 300 features the TMOV 200 of FIGS. 2A-2D, including the sensor 220 and the magnets 226*a* and 226*b*. In exemplary embodiments, a reporting circuit 302 receives indication 304 from the sensor 220 once the magnets 226*a* and 226*b* are proximate the sensor, as described above. The indication 304 may be a signal, as one example. Where the sensor 220 is a reed switch, the closing of the switch provides the indication 304 by closing the circuit consisting of the reed switch and the indicating circuit 302. In response to receiving the indication 304, the reporting circuit 302 may issue a signal 306. In one embodiment, the reporting circuit 302 is remote from the TMOV 200.

In exemplary embodiments, the wires 222*a* and 222*b* of the sensor 220 are connected to the reporting circuit 302 such that the indicator 304 may be transmitted to the reporting circuit. Where the sensor 220 is a reed switch, the indicator 304 is simply the closing of the circuit between sensor and reporting circuit 302. In exemplary embodiments, the reporting circuit 302 indicates, by way of signal 306, that the TMOV 200 is in a non-operational state. Thus, in exemplary embodiments, the signal 306 is a real-time signal to indicate the working status of the TMOV 200.

In one embodiment, the reporting circuit 302 is software-based, including a processor and software to receive the indicator 304 and issue the signal 306 of the TMOV 200 status. In another embodiment, the reporting circuit 302 is hardware-based and includes circuitry to receive the indicator 304 and provide notification of the TMOV 200 status via the signal 306. In yet another embodiment, the reporting circuit 302 includes a mixture of software- and hardware-based components to receive the indicator 304 and issue the signal 306.

In one embodiment, the reporting circuit 302 is connected to a monitor with a graphical user interface (GUI), enabling the signal 306 to be transmitted to the monitor and visually received. The GUI that presents the signal 306 to the monitor is non-limiting. In another embodiment, the signal 306 is a visual indicator (without use of a monitor), such as a light-emitting diode (LED) which lights up in response to the indicator 304 being sent by the sensor 220. In yet another embodiment, the signal 306 is an audible indicator, such as a speaker that emits an audible sound in response to the indicator 304 being sent by the sensor 220. In exemplary embodiments, the TMOV status system 300 provides a remote mechanism for obtaining the status of the TMOV 200 (via the indicator 304) and conveying the status (via the signal 306). The signal 306 thus enables an individual to remove and replace or repair the TMOV 200.

In exemplary embodiments, the novel TMOV 200 and the TMOV status system 300 provide several advantages. The real-time indicator 304 which, in some embodiments, is the closing of the circuit between the sensor 220 and the reporting circuit 302, is provided to indicate the working status of the TMOV 200. Remote monitoring of the TMOV 200 is thus possible. The integrated sensor 220 is able to switch the reporting circuit 302. The integration of the magnets 226 with the arc shield 206 structure provides a simple update that enables the sensor 220 to be activated at the desired moment, namely, the moment when the solder is melted and the TMOV becomes a no longer functioning open circuit. The magnets 226 thus move in concert with the arc shield 206. Put another way, the magnets 226 move simultaneously with the arc shield 206. Further, the magnetic trigger method has strong anti-interference in super high-voltage applications. The electrode 214, MOV 208, and contact lead 216 are live parts during operation of the TMOV 200. Thus, arcing may occur between the contact lead and the electrode in super high-voltage applications. This arcing may cause false triggering of the reporting circuit. So, compared to the trigger method by contacting (pressing or pushing), the magnetic method of the novel TMOV status system 300 without making contacting with any parts is a more anti-interference approach. Further, the novel TMOV 200 and the TMOV status system 300 are implemented at a low cost and provide high accuracy.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

While the present disclosure makes reference to certain embodiments, numerous modifications, alterations and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof.

The invention claimed is:

1. A surge protection device (SPD) comprising:
- a metal oxide varistor (MOV) comprising an electrode;
- a spring disposed adjacent the MOV, the spring comprising a contact lead to be coupled to the electrode by a solder paste;
- an arc shield disposed adjacent the spring, the arc shield to slide over the electrode in response to the solder paste being melted;
- a magnet disposed on the arc shield, the magnet to move simultaneous with movement of the arc shield; and
- a sensor to provide an indicator, wherein the magnet is proximate the sensor in response to the arc shield sliding over the electrode.

2. The SPD of claim 1, wherein the spring moves away from the MOV in response to the solder paste melting.

3. The SPD of claim 1, wherein the sensor is adjacent the MOV.

4. The SPD of claim 1, further comprising an enclosure, wherein the sensor is coupled to the enclosure.

5. The SPD of claim 1, the arc shield further comprising a tension spring, wherein the tension spring causes the arc shield to slide over the electrode.

6. The SPD of claim 1, wherein the sensor is a reed switch.

7. The SPD of claim 6, wherein the indicator is the reed switch closing.

8. The SPD of claim 1, wherein the sensor is coupled to a reporting circuit.

9. The SPD of claim 1, wherein the MOV is a thermally protected metal oxide varistor (TMOV).

10. A thermally protected metal oxide varistor (TMOV) status system comprising:
- a TMOV, comprising:
  - a sensor disposed inside an enclosure of the TMOV; and
  - a magnet disposed on an arc shield of the TMOV, the magnet to move in concert with the arc shield, wherein the sensor provides an indication in response to the magnet being proximate the sensor; and
- a reporting circuit to issue a signal in response to receiving the indication.

11. The TMOV status system of claim 10, wherein the sensor is affixed to the enclosure of the TMOV.

12. The TMOV status system of claim 10, wherein the enclosure further comprises an opening through which two wires are coupled between the sensor and the reporting circuit.

13. The TMOV status system of claim 12, wherein the sensor is a reed switch.

14. The TMOV status system of claim 13, wherein the indication is a closing of the reed switch.

15. The TMOV status system of claim 10, the TMOV further comprising:
- an MOV comprising an electrode; and
- a spring disposed adjacent the MOV, the spring comprising a contact lead to be coupled to the electrode by a solder paste.

16. The TMOV status system of claim 15, wherein the arc shield slides over the MOV in response to the solder paste melting, causing the magnet to be proximate the sensor.

17. The TMOV status system of claim 15, further comprising a second magnet, wherein the magnet is disposed on one side of the spring and the second magnet is disposed on the arc shield on an opposing side of the spring.

18. A thermally protected metal oxide varistor (TMOV) comprising:
- a metal oxide varistor (MOV) comprising an electrode;
- a spring disposed adjacent the MOV, the spring comprising a contact lead to be coupled to the electrode by a solder paste;
- an arc shield disposed adjacent the spring, the arc shield comprising a tension spring to cause the arc shield to slide over the electrode in response to the solder paste being melted;
- a magnet disposed on the arc shield, the magnet to move simultaneous with movement of the arc shield; and
- a reed switch comprising a first blade and a second blade, wherein the magnet is proximate the reed switch in response to the arc shield moving over the electrode.

19. The TMOV of claim 18, wherein the first blade couples with the second blade in response to the magnet being proximate the reed switch.

20. The TMOV of claim 19, further comprising:
- a housing to seat the MOV, the spring, the arc shield, and the magnet; and
- an enclosure to fit around the housing, wherein the reed switch is coupled to the enclosure.

* * * * *